Sept. 20, 1966 R. C. LIEBERT 3,273,258
EGG DRYER
Filed Jan. 16, 1964 4 Sheets-Sheet 1
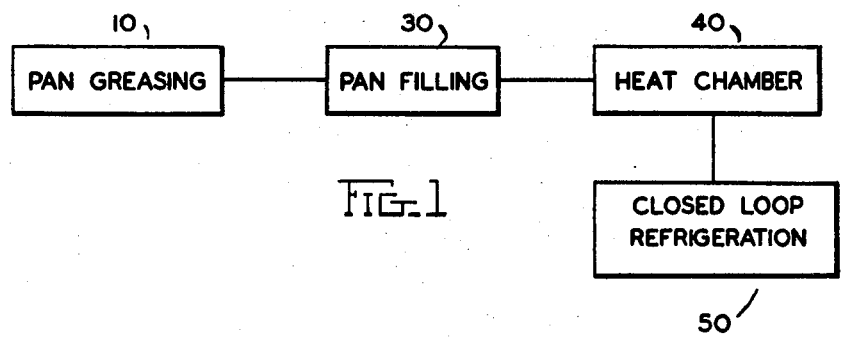
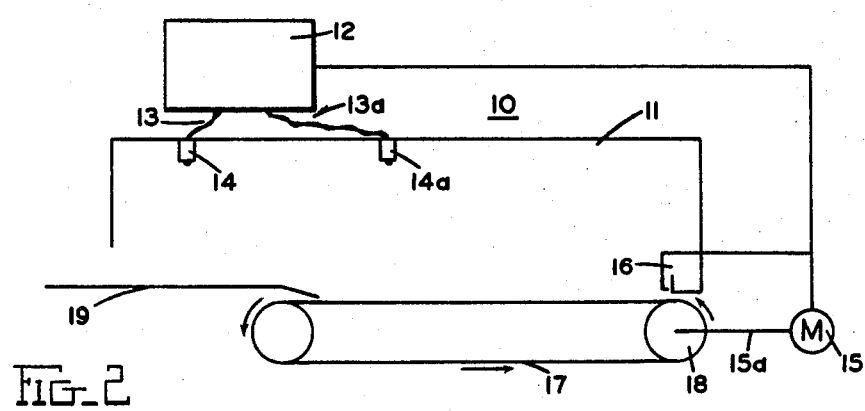
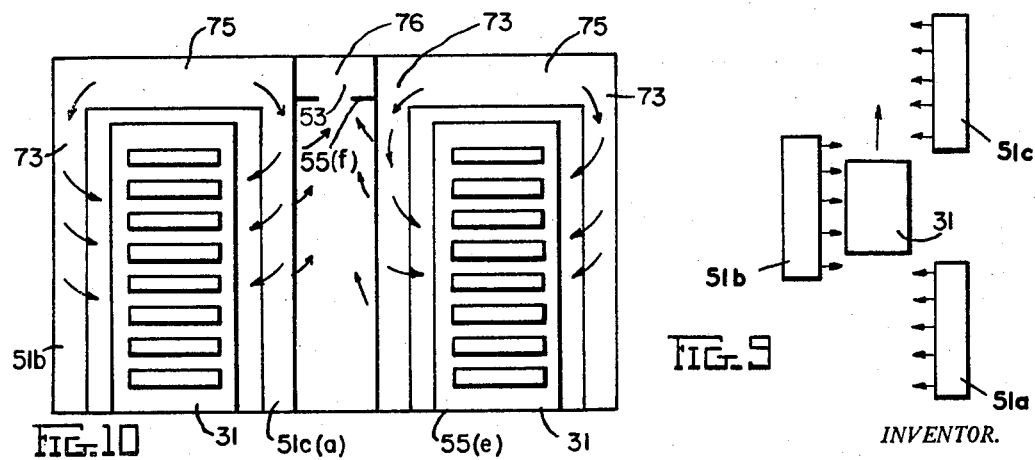
INVENTOR.
RALPH C. LIEBERT
BY
Anthony D. Cennamo Sept. 20, 1966  R. C. LIEBERT  3,273,258
EGG DRYER Filed Jan. 16, 1964  4 Sheets-Sheet 2

INVENTOR.
RALPH C. LIEBERT
BY
Anthony D. Cennamo

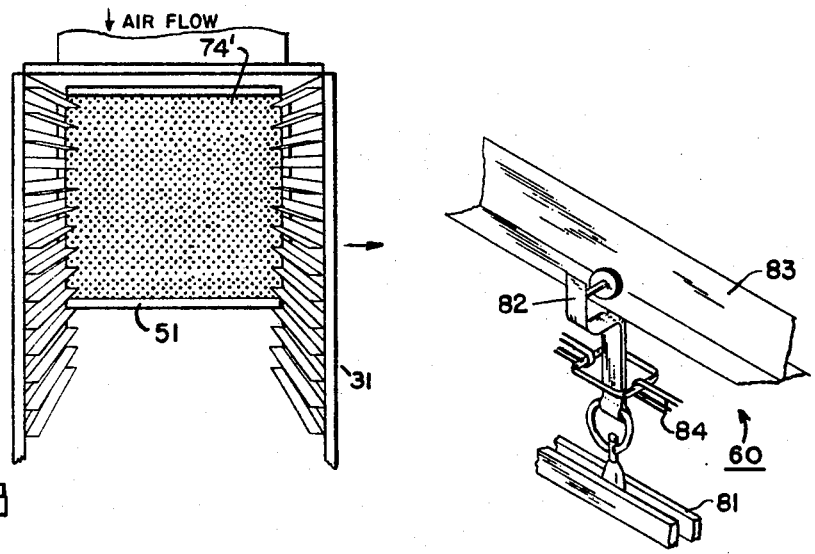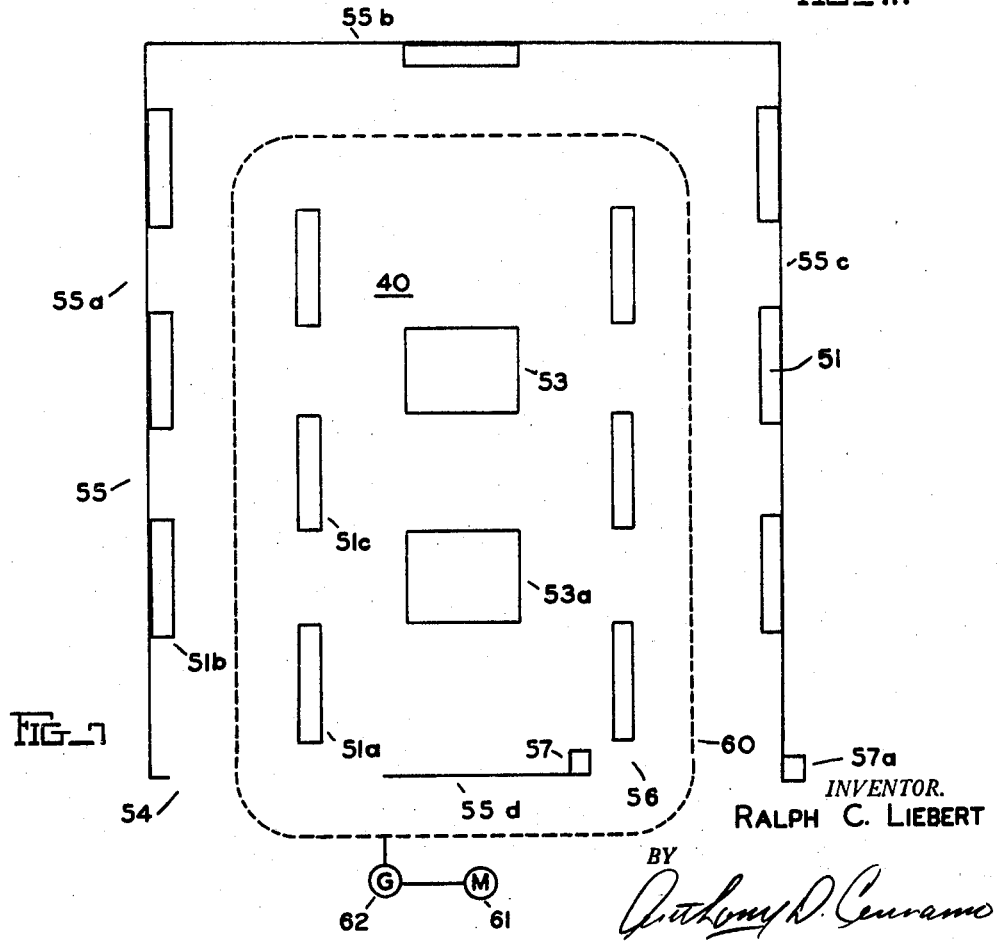

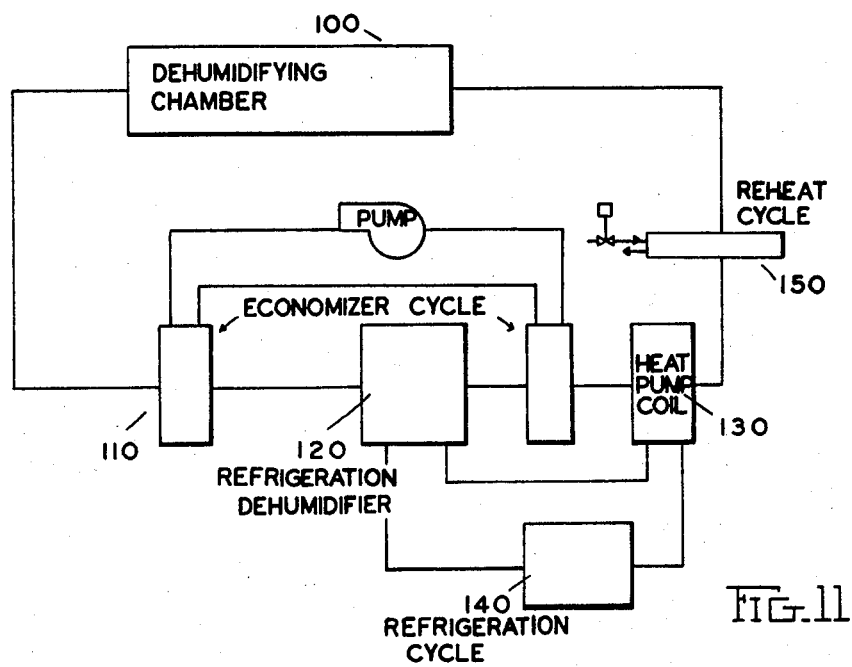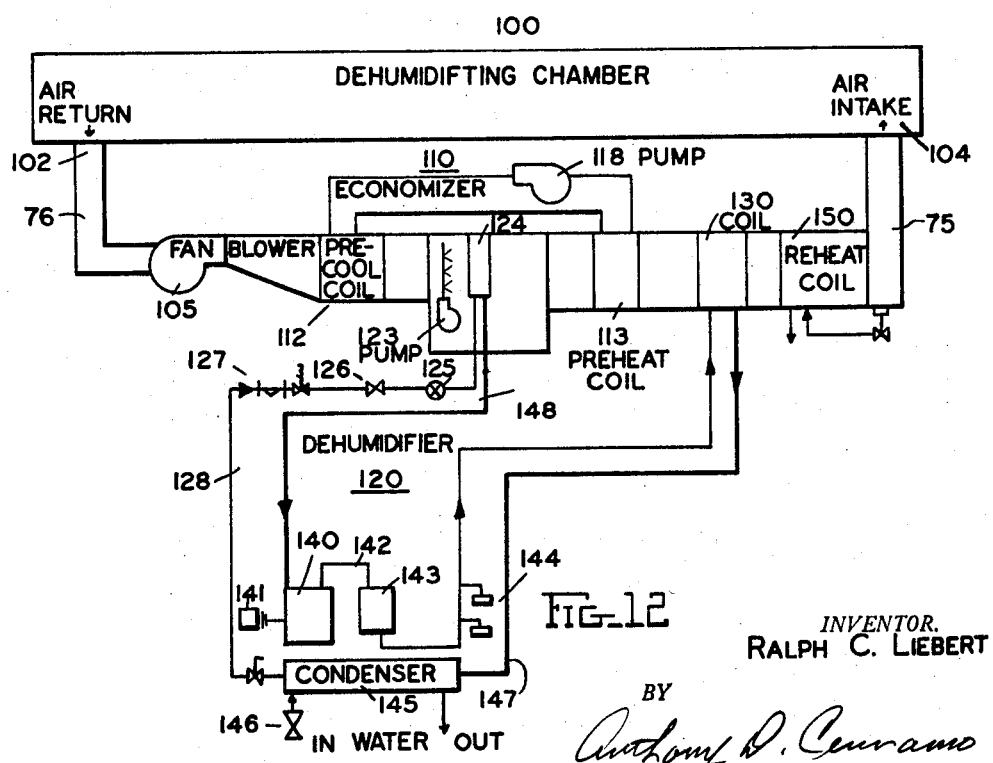

United States Patent Office 3,273,258
Patented Sept. 20, 1966

3,273,258
EGG DRYER
Ralph C. Liebert, 580 Keyes Lane, Worthington, Ohio
Filed Jan. 16, 1964, Ser. No. 338,154
16 Claims. (Cl. 34—62)

This invention relates generally to a process and apparatus for moisture removal from materials and particularly to an automatic industrial process and apparatus for controlling the removal of moisture from materials irrespective of the surrounding environmental or atmospheric conditions.

The present invention is especially well adapted to the control of the removal of moisture from any material whether it be solid, semi-liquid or liquid. Substantially, every manufactured product, whether it is from a synthetic or natural base, passes through a moisture removal state. In addition, products remaining in their natural state, i.e., not passing through a transformation, will also go through a moisture removal process. Food stuffs and articles are typical of products remaining in their natural state. One food product successfully dehydrated—moisture removed—with the present invention, is eggs. Accordingly, the invention, as hereinafter described, will be directed to an egg-drying process; it is understood, of course, that this invention is not to be so limited.

Despite the advances in sciences and modern technology, the art of drying eggs continues to comprise the archaic methods of depending on environmental conditions. The egg drying process, and in many other food drying processes, simply consists of sun or outdoor drying, or perhaps indoors with an open atmosphere. The inherent disadvantages of this age-old process are quite apparent and will suffice to say is seasonal, unpredictable, wasteful, and many times unsanitary. The technological advances on this method of drying have neither improved on the product nor its producibility. To compound the problems of the egg drying industry, it is to be recalled the greatest abundance of eggs occurs in the spring and that the worst atmospheric drying conditions also occur at this time.

In the egg drying process, it has been determined that in the order of 86% of the moisture is to be removed. This leaves a product consisting of 14% moisture and 86% solid. It is at this moisture ratio that an idealistic crystalline state will exist in the egg product and being hard, brittle, and somewhat clear in yellowish color. This condition will permit the product to break up in relatively large pieces. An uncontrolled moisture product will effect the crystalline state causing a cloudy yellow color and when broken up to reduce to a granular state. Further, the quality of the product is directly related to the above-mentioned resulting conditions. The better quality dried egg product—large clear pieces—will be used in finer candies, taffy, and better grade "egg" noodles. The cloudy granular product will not be wasted, but its use may be found in cheaper grade of candies. It is also quite obvious that the dollar return is directly related to the quality of the product. In a conventional process, as to be described hereinafter, each pan of dried eggs will comprise a product of varying quality. It is customary, therefore, to provide a screen sifting process to divide the product into the several grades.

The conventional industrial type of egg drying process still basically comprises permitting the liquid eggs to dry in the open atmosphere. Very generally, such a process may include a plurality of pans—in the order of thirty—that are hand filled and placed in a rack one above the other. The racks of pans are then placed in a closed chamber—or the racks may be permanently in the chamber and the pans placed therein. The number of racks will consist of at least six or eight. In the chamber the air is taken from the outer atmosphere, heated, passed through the racks and hence the pans, and then released to the atmosphere again.

The disadvantages, or problems existing in the prior art system are almost too numerous to mention, and no attempt is made to be inclusive. To enumerate a few, the air that is heated is still dependent upon the atmosphere, and hence of varying moisture from day to day and season to season. Also, of course, the temperature and humidity are variable from one extreme to the other requiring elaborate air conditioning systems for temperature control. The blower systems are poorly ducted and generally simply comprise major air system directed downwardly through one side of one of the racks. It is apparent then that each of the plurality pans will have passed thereover a different amount of air. A considerable difference in the degree of moisture removal is noted from the end of the pan receiving the air to the opposite end; and, since there are at least six racks, it must be appreciated that the air passing from one rack to the other will have picked up moisture. To avoid the non-uniformity of air blowing from pan to pan, and rack to rack, the prior art process includes the crude step of having attendants continually entering the chamber to shift the pans around. The chamber moisture removal is not complete and the pans of eggs still contain an excess amount of moisture. To emphasize the inefficiency of the prior art system is the final step of drying which comprises removing the pans from the racks in the chamber and stacking them one over the other in an open ordinarily heated room. Simply, the prior art system lacks control and is only a little better than the ordinary atmospheric drying process. Finally, as pointed out above, the drying air is released to the atmosphere again, and needless to say has a redolent odor which is a nuisance to the area.

The present invention is an industrial process that eliminates the above-noted inherent disadvantages of the prior art system. Specifically, the invention is a completely automated moisture removal system, maintaining complete temperature and moisture control of the product from its raw state to the exact final state desired. The system is operable irrespective of the atmospheric surrounding conditions and is not dependent thereon.

It is accordingly a principal object of the present invention to provide a new and improved product moisture removal industrial process.

It is a further object of the invention to provide a product moisture removal industrial process that is fully controlled irrespective of the surrounding atmospheric conditions and not dependent thereon.

Another object of the invention is to provide a product moisture removal industrial process that is effective to uniformly remove the moisture from a given amount of the raw product thereby resulting in a higher grade product.

Another object of the invention is to provide a product moisture removal industrial process that is completely automatic and does not require attendance or observance.

Still another object of the invention is to provide a product moisture removal industrial process that does not contaminate the atmosphere.

Other objects and features of the invention will become apparent from the following detailed description when taken in conjunction with the drawings in which:

FIGURE 1 is a block schematic of the over-all dehumidifying process of the invention;

FIGURE 2 is the pan greasing system and apparatus utilized in the present invention;

FIGURE 7 is a top view of the dehumidifying chamber of a preferred embodiment of the invention;

FIGURE 7A is an isometric fragmentary view of the pulley system in FIGURE 7;

FIGURE 8 is a duct arrangement for dispensing air over the pans in the chamber of FIGURE 7;

FIGURE 9 is an illustration of the air circulation paths in the chamber of FIGURE 7;

FIGURE 10 is an end view of the chamber of FIGURE 7 and specifically illustrating the general air flow;

FIGURE 11 is a simplified block schematic flow diagram of the complete refrigeration system utilized in the process of the present invention; and, FIGURE 12 is a more detailed block schematic flow diagram of the refrigeration system of FIGURE 11.

Figure 3:
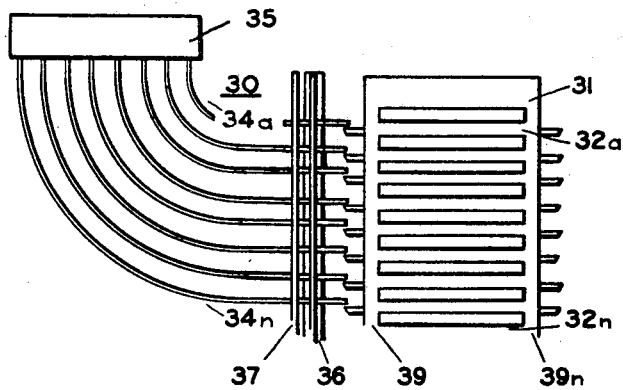
FIGURE 3 is the pan filling system and apparatus and specifically showing the rack of pans.

Referring now to the drawings and particularly FIGURE 1, the basic system of the present invention comprises a pan greasing unit 10 where each pan to receive the material to be dried is automatically and accurately greased, a pan filling station 30 where a plurality of pans in a supporting rack are simultaneously filled and wherein each pan is filled to an exact amount of material. A conveyor to move the filled pans stacked in the rack through a new and improved heat chamber 40, and finally, there is provided in the process, a refrigeration system 50 operable to maintain a constant flow of air at a controlled temperature and humidity through chamber 40.

The pan greasing unit 10 is shown schematically in FIGURE 2 to illustrate more specifically its operation. Generally a controlled amount of warm grease is sprayed on each pan in a uniform spray. Mechanically, pot 12 has therein a grease—such as Vaseline—that upon being heated is liquefied. Accordingly, pot 12 is kept at a temperature—by a self-enclosed heating element—to maintain the grease in a liquid state. Leading directly from the pot 12 are a pair of sprayers 14 and 14a having connections 13 and 13a. The sprayers 14 and 14a are positioned in a box 11 to emit the liquid grease over a fixed area equivalent to the area of a pan desired to be sprayed. The spray is timed to emit only a given amount of liquid grease. To assure that the grease is deposited uniformly over the entire area of the pan, the sprays are maintained in an off position until actuated. To actuate the sprays 14 and 14a, an electrical switch 16 is provided in the rear of box 11. Also, to insure that the liquid is sprayed over the entire pan, a conveyor 17 is positioned on the lowermost portion of the box 11. The conveyor 17 is also quiescent until actuated by switch 16 which actuates the motor 15 connected by shaft 15a to the drive 18. Table 19 is shown to support the trays.

To automatically grease a pan, the pan is placed on the table 19 and pushed to the rear of the box 11. When its extent of travel is reached, the contacts of switch 16 will close and thusly energize two things—the motor 15 and sprays 14 and 14a. The motor 15 will actuate the drive 18 and hence the belt 17 in a rearwardly direction. The drive will be for a period of time to permit the entire pan to be ejected from the box 11. Also, the sprays 14 and 14a are energized just as the pan is moving directly thereunder. The spray of liquid grease continues until the pan is completely out of the box 11 and again returns to an off position and thereafter awaits the next pan.

The pans, after being greased, are individually placed in a rack 31 such as shown in FIGURE 3. Although the pans are manually positioned on the rack for filling, means may be provided to automatically stack the pans.

The particular rack in a preferred embodiment is designed to hold thirty-two pans and although generally conventional, it must have sufficient structure to maintain the pans in a relatively perfect level position. The rack of pans is then placed in a filling station 30. This too may be done manually or means may be provided to have the rack automatically pass through the filling station. This filling station comprises apparatus to meter to each pan an exact and equal amount of liquid material. The station, as shown here, is gravity fed, but if for space requirements or other necessities, the material may be pumped. The major components of the fill station includes tank 35, feed lines 34a . . . 34n, a position support 37, and cut-off 36 actuated by hydraulic compressor 33 and driven by motor 38. The rack 31 comprises upright supports 39 and 39a, and level supports 32a . . . 32n.

Figure 4:
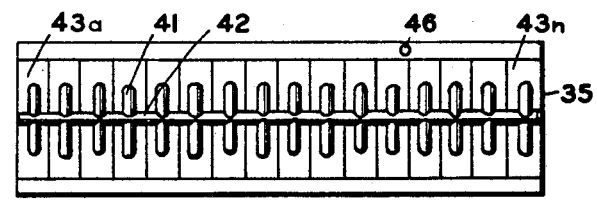
FIGURE 4 is another aspect of the filling system and specifically a plan view of the liquid material metering tanks.
Figure 4A:
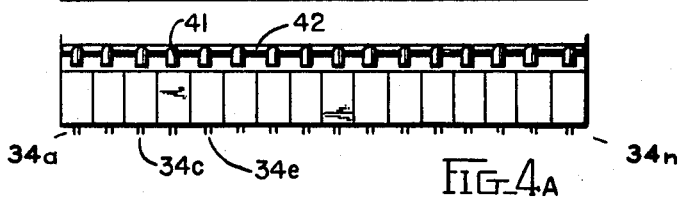
FIGURE 4A is a sectional elevation through the view of FIGURE 4.
Figure 5:
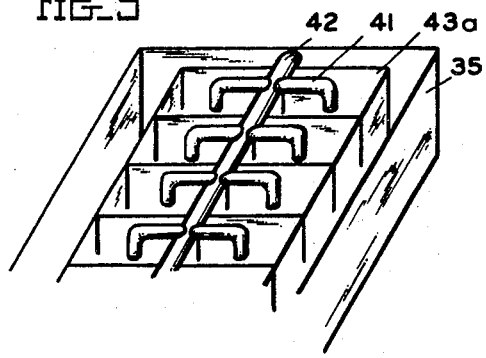
FIGURE 5 is another view of the metering tanks shown in FIGURE 4.

In FIGURES 4 and 5 the tank 35 is shown to have therein a plurality of minor tanks 43a . . . 43n; the number corresponding to the pans to be filled. Each minor tank has a feed line 41 serviced by a principal feed 42. A level float 46 is also within the major tank 35.

Figure 6:
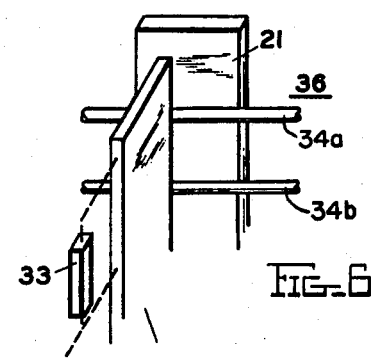
FIGURE 6 illustrates the mechanical switch of the pan filling system of FIGURE 3.

In operation of the filling station, rack 31 is so positioned that each pan stacked therein is adjacent a feed line. With the rack in place, there is actuated the fill switch opening a valve to the fluid material. The major feed 42 is now opened permitting the liquid to enter the minor tanks 43a . . . 43n through the individual feeds 41a . . . 41n. The liquid is permitted to overflow the minor tanks into the major tank 35. In this way each minor tank has a metered amount of fill. The amount held in the minor tank corresponds exactly to that desired to be entered into the drying pans. If it is desired to vary the amount of fill in the pans, an aperture or a series of apertures in the side of the minor tanks may be opened to control the amount of fill. Connected to the bottom of each of the minor tanks 41a . . . 41n are the feed lines 34a . . . 34n. The feed lines, a respective one for each of the minor tank, is liquid tight to the major or outside tank 35 to prevent spillage. Each feed line 34a . . . 34n is directed through guides 36 and 37 to a respective drying pan. The guide 37 supports the lines in their proper positions whereas guide 36 is operative as a mechanical switch or shut-off valve. Specifically, guide 36 as shown also in FIGURE 6 comprises a pair of plates 21 and 22 at right angles to each other that extend vertically for the height of the rack of pans. When the hydraulic compressor 33 is actuated by motor 38 the knife action of the plate 22 "pinches off" the plurality of feed lines against plate 21, thereby cutting off liquid flow. When the mechanical switch is opened, the liquid in the minor tanks 43a . . . 43n is expelled through the feed lines 34a . . . 34n, into the pans 33a . . . 33n. Upon emptying the tanks 43a . . . 43n, the mechanical switch is again closed and the tanks 43a . . . 43n again filled for the next set of trays.

The major tank 35 and the minor tanks 43a . . . 43n are preferably made of stainless steel primarily for sanitation purposes. Also, the feed lines are made of clear plastic material for the same reason. When food stuffs, such as liquid egg, are dispensed, it may be desired to maintain the fill system under refrigeration. Also, in view of simplicity of construction, the entire system may readily and conveniently be washed down by simple hosing.

In FIGURES 7 through 10, the drying chamber 40, shown partly in schematic and partly pictorially, is a completely automated moisture removal system constructed in accordance with the present invention. Generally, the requirements to be met by the chamber is to provide a constant source of air at a uniform temperature and humidity; a blower directing system that distributes an even and continuous flow of air through each pan, and uniformly over the pan; and an air return system in the chamber to assure that the air is blown only once over the pan of material. To accomplish the intended results, the chamber system 40 comprises an enclosure 55, a continuous pulley system 60, air ducting means 51, and an air return port 53.

The enclosure 55 is a complete chamber box having four walls 55a, 55b, 55c, and 55d, a floor 55e and ceiling 55f. A first opening 54 in the wall 55d permits the entry of the rack of pans 31, and a second opening 56 permits the exit of the rack of pans 31. To assure that the chamber 40 is a closed chamber, an air curtain 57 is drawn across the second opening 56. The air nozzles 57 and 57a provide the curtain air stream to maintain an air enclosure within the chamber. The other two major openings in the chamber 40 are to permit the constant velocity air to circulate therethrough as described hereinafter.

The pulley system 60 is generally shown in FIGURE 7a and is more or less conventional and provides continuous movement be extremely uniform and smooth without jerking movement that may agitate the liquid material. The pulley system as shown, includes a rack carrier 81 suspended from a guide 82 for movement on guide rail 83 via a chain 84 which is motor driven by motor 61 through an extremely slow geared down unit 62.

The air ducts 51a ... 51n are of the height, extending from the ceiling to the floor. In FIGURE 8 it is apparent that the openings 74 extend vertically to coincide with the highest and lowest pan in the rack 31. The number of openings 74 may, of course, be varied, and have as its purpose the even distribution of air over each pan in the rack. In the preferred embodiment, the width of the duct 51 is somewhat less than the over-all width of the rack 31. The number of ducts in the chamber 40 may be varied to suit the particular material being dried. To provide a uniform distribution of air over each pan and over each part of the pan, the ducts 51a ... 51n are staggered throughout the chamber 40. The staggered arrangement of the ducts 51 is shown in FIGURES 7 and 9 together with an illustration of the intended purpose. The ducts 51a ... 51n are alternately placed on either side of the passageway of the rack 31, the width of the one duct extending into the path of the alternate duct. In this way there is given a constant flow of air from both directions over each pan in the rack extending from the uppermost to the lowest. Since the velocity of the air stream is constant and the stream is from both directions, a circulatory flow of air is provided over each pan. The air path is shown by the arrowed lines in FIGURE 9. With a uniform passage of air over each part of the pan, the material therein will have equal amounts of moisture simultaneously removed over all sides. As pointed out above with respect to the prior art system wherein the air is passed from one side only, the edges of the pan dried much quicker than the center. This, of course, led to each pan having a product of varying quality. This was further complicated by the nonuniformity, even from the one direction, of the amount of air passing over the uppermost and lowest pan. Consequently, the product quality resulting from the preferred embodiment is substantially improved over that of the prior systems.

Another disadvantage pointed out above with the prior art system, was that the air utilized to dry the material was continuously recirculated and, hence gathered moisture from rack to rack. In order to overcome this disadvantage I have provided in the preferred embodiment an arrangement wherein the air is passed over the pans in the rack once, and then exhausted. In FIGURE 10 there is shown in a preferred embodiment the entry and the exhaust path of the drying air. The entry duct 75 terminates in the openings 74 of the drying ducts 51. After the air has passed over the pans, as described above, it is exhausted through the ports 53 and outwardly to the refrigeration unit through exhaust duct 76.

In order that the system of the present invention may be completely independent of atmospheric and environmental conditions, I have provided a new and improved refrigeration system that is uniquely adaptable to a material drying process. Basically, the refrigeration system of the present invention is an air recycling process, i.e., closed loop. In this way the system is not dependent on the surrounding environmental conditions with its varying temperature and humidity. Furthermore, with the preferred embodiment's closed loop, the air is not exhausted into the atmosphere and, consequently, does not contaminate the surrounding area with an offensive odor.

Referring to FIGURE 11, there is illustrated a simplified block schematic, and FIGURE 12 a preferred embodiment in block schematic of a refrigeration system for use in the present invention. Very generally, the air intake to the refrigeration system is cooled in successive steps, cleaned, heated in successive steps, and recirculated through the drying system as set forth above. It can be appreciated that in addition to the temperature control the cooling process includes dehumidification.

The refrigeration system further includes a unique and novel arrangement of utilizing the expended heat in the dehumidification step to reheat the air in the successive step. This has been termed an "economizer" system.

With specific reference to FIGURE 11, the primary components of the system comprise the air cycle or dehumidifying chamber 100 referred to above as the drying chamber, the water economizer cycle 110 for precooling, the refrigeration dehumidifier 120, the runaround heat pump refrigeration cycle 140, the heat pump condenser coil 130, and the steam or hot water or resistance electric reheat cycle 150. A more detailed and preferred embodiment of a complete refrigeration system in an arrangement with the drying process is shown in FIGURE 12. In this embodiment, the dehumidifying chamber 100 is provided with the high temperature dry air intake 104 and the moist air return 102. The air recycling is created by the supply fan and blower system 105. Since the temperature of the circulating air in the system is lowered to dehydrate, then again raised, an economizer cycle 110 is utilized in the system. This cycle comprises the water circulating precooling coils 112 operative to lower the temperature of the air and water circulating preheating coils 113 to reheat the air. Economy is achieved in this cycle by recirculating the same water through the two sets of coils 112 and 113. Pump 118 maintains the circulating water flow. The refrigeration dehumidifier 120 comprises a spray pump unit 123 and direct expansion refrigeration coil 124. The heat pump condenser coil 130 is followed by the final steam, water, or electric reheat coil 150.

The refrigeration dehumidifier run-around system 120 is also shown in detail in FIGURE 12. In sequence, this sub-system comprises in addition to the direct expansion coil 124, an expansion valve 125, a solenoid valve 126, dehydrator 127, liquid line 128, reciprocating compressor 140, driven by motor 141, hot gas discharge line 142, hot gas muffler 143, limit relief valves 144, combination water or air cooled condenser and liquid receiver 145, liquid regulating valve 146, liquid return 147, and the suction line 148.

In operation of the refrigeration system shown in FIGURE 11 and FIGURE 12 in dehumidifying a material as described above, the refrigeration cycle is in a closed loop arrangement with the chamber 100. Specifically, the dehumidified hot air is taken in at intake 104, passes through the process chamber 100, and is returned at return 104 as moist air (and somewhat cooled) to the refrigeration loop. In a typical process, the air is returned—leaves the process chamber—at 110° F. at the return duct 102. This air is drawn by the fan 105 into the economizer precooling coil 112 where the temperature is reduced to 80°. The air passing through the spray unit is lowered in temperature to 45°; and at this step in the process relatively all of the moisture is removed therefrom. The spray pump 123 in addition serves another very important function, namely, a cleansing action. The air here is washed and all of its impurities removed to assure the system with a continuous flow of pure air. The cleansing action is, of course, a distinct advantage over the prior art systems requiring the use of air directly from the atmosphere of questionable purity. But, again, the cleansing action of spray 123 further provides not only the function of cleansing the air of its impurities and odors, but also of disposing of them as a liquid waste. In this way, the offensive odors from the material drying process, and especially those that come from a food curing process, are not returned to the atmosphere.

Returning now to the refrigeration system, the purpose of cooling the air is to remove the moisture and then the next function of the process is to return the air to its hot drying temperatures. The reheat cycles—just at the cooling cycles—are done in successive steps. The first reheat step is in the economizer reheat coil 113 wherein the air is heated to the order of 75°. The precool coils 112 and preheat coils 113 are herein referred to as economizer coils since they are a closed loop arrangement that utilize the heat taken in the cooling cycle to reheat the coolant in the reheating cycle. The continuous flow of fluid through the two sets of coils is maintained by the pump 118 in either line 114 and 115.

The next reheat step occurs in the heat pump condenser coil 130 where the air is heated to the order of 110° F. The final reheat step occurs in the steam, hot water, or electric coil 150 where the temperature of the dry air is established at 120°. From the last heating step the hot dry air is passed into the chamber via intake 104 and over the material being dehumidified as described above, then recycled for continuous treatment.

Of significance to the operation of the system—in permitting an elaborate and sophisticated system to be economically operable—is the heat pump refrigeration cycle between the spray pump 123 and the refrigeration condenser coil 130. In operation of this run-around system, the refrigerant leaves condenser 145 through line 128 at approximately 90°. The liquid refrigerant passes through the dehydrator 127, the solenoid valve 126 and the expansion valve 125 and into the direct expansion refrigeration coil 124. Through this coil 124 the refrigerant absorbs heat from the liquid spray 123—and the passing air—prior to being returned via suction line 148 to the compressor 140 at about 40°. Here the refrigerant is put under pressure and compressed to 120°. The compressed refrigerant—now in gaseous form—is expelled through the hot gas discharge line 142 and through the muffler 143. At this step any excessive pressure is relieved through the limit relief valves 144. The hot gas at 120° is passed to the condenser coil 130 where the hot gas is cooled and partially condensed by the air stream. The air stream entering the condenser is in order of 75° and is raised to the order of 110° by the heat given up in the condenser. The lowering of the temperature of the hot gas—by action of giving up heat—reverts the gas partially back to a liquid refrigerant. The liquid and gas mixture is then returned via liquid return line 147 again to the condenser 145 to complete the condensation of the gas for recycling in the loop or run-around.

Although certain and specific embodiments of the invention have been shown as preferred, it is to be understood that other embodiments, modifications and applications of the invention may be had without departing from the spirit and scope of the invention.

What is claimed is:

1. An industrial material dehumidifying system for the warm air drying of materials comprising, a closed chamber in which materials are to be dried and having a material entry and an exit, means for moving said material to be dried from said entry through said chamber and to said exit, an air intake and an air exhaust connecting to said chamber, means creating an air stream between said intake and said exhaust, said means for moving said material being intermediate said air streams; and an air conditioning unit for recycling the air between said air intake and said exhaust and including air heating means and air cooling means connected to a refrigeration cycle for maintaining said air stream at a constant warm temperature and low relative humidity being supplied from said air intake.

2. A system as set forth in claim 1 wherein said chamber has four sides, a ceiling and a floor, wherein said entry and exit are in one end thereof, and means for maintaining a closed air passage in said chamber.

3. A system as set forth in claim 1 wherein said chamber has four sides, a ceiling and a floor, and wherein said means for creating an air stream between said air intake and exhaust comprises an elongated duct extending from said ceiling to said floor and comprising a plurality of ports to permit the lateral expelling of air in a uniform stream extending substantially from said ceiling to said floor.

4. A system as set forth in claim 1 wherein said chamber has four sides, a ceiling and a floor and said means for creating an air stream between said air intake and said exhaust comprises at least a pair of ducts positioned on either side of said material passage way, said ducts having an elongated configuration and extend from said ceiling to said floor and comprising a plurality of ports to permit the lateral expelling of air in both directions across said material in a uniform stream extending substantially from said ceiling to said floor.

5. An industrial material dehumidifying system comprising, a closed chamber having four sides, a ceiling, a floor, an entry and an exit in one side thereof, and means for maintaining a closed air passage in said chamber; an air intake and an air exhaust in said chamber, a receptacle means for holding said material covering substantially a height from said floor to said ceiling, means for moving said receptacle in a path from said entry through said chamber to said exit, a plurality of elongated ducts in said chamber positioned in staggered relationship on either side of said receptacle path, said ducts each having its one end joining said air intake and in its elongated side facing said path a plurality of ports to permit the lateral expelling of air in both directions across said material in a uniform stream extending substantially from said ceiling to said floor, said staggered relationship causing said air to circulate through said ceiling to create a direct air stream through said material; and a refrigeration cycle for maintaining said air stream at a constant temperature and humidity.

6. An industrial material dehumidifying system as set forth in claim 5 wherein said refrigeration cycle is a closed loop through said chamber including successive means to cool and to heat.

7. An industrial material dehumidifying system as set forth in claim 5 wherein said refrigeration cycle for maintaining said air at a constant humidity includes means to cool said air and a succeeding means to heat said air to said constant temperature.

8. An industrial material dehumidifying system as set forth in claim 5 wherein said refrigeration cycle for maintaining said air at a constant humidity includes means to cool said air and a succeeding means to heat said air to said constant temperature; said cooling means including a water spray means to remove the impurities and odors contained therein.

9. An industrial material dehumidifying system as set forth in claim 5 wherein said refrigeration cycle includes blower means for moving said air through said chamber, a first cooling means to cool said air to a given temperature lower than said exhaust air, a second cooling means to cool said air to another given temperature below that of said first means, a first heating means to heat said air to a temperature substantially above that from said second cooling means, a second heating means to heat said air to a temperature substantially above that from said first cooling means, and a final heating means to heat said air to a temperature above that of said exhaust.

10. An industrial material dehumidifying system as set forth in claim 9 wherein said first air cooling means and said first heating means is a reciprocal water circulating system.

11. An industrial material dehumidifying system as set forth in claim 9 wherein said second cooling means and said second heating means comprises a reciprocal refrigerant circulating system.

12. An industrial material air dehumidifying system for the warm air drying of materials comprising, means for recycling said air through a closed chamber containing said material, a first cooling means to cool said air to a given temperature lower than said air leaving said chamber, a second cooling means to cool and dehumidify said air to another given temperature below that of said first means, a first heating means to heat said air to a temperature substantially above that from said second cooling means, a second heating means to heat said air to a temperature substantially above that from said first cooling means, and a final heating means to heat said air to a temperature supplied to said chamber above that leaving said chamber and at a relative humidity below that leaving said chamber; said second cooling and heating means further comprising a direct expansion evaporator and an air cooled condenser respectively of a unitary closed loop refrigeration cycle unit.

13. An industrial system as set forth in claim 5 wherein said receptacle includes means to support a plurality of material trays, means for dispensing said material to said trays, and means to meter said material being dispensed.

14. An industrial system as set forth in claim 5 wherein said receptacle includes means to support a plurality of liquid material trays, means for dispensing said liquid to said trays comprising a plurality of liquid tanks one of each in communication with one of said trays; said tanks having a full level to that desired to be dispensed to said tray, means for filling said tanks and means connected with said communication means for emptying said tanks into said trays.

15. An industrial system as set forth in claim 5 wherein said receptacle includes means for supporting a plurality of liquid material trays; means for preventing said liquid material from adhering to said trays further comprising means for dispensing a liquid grease uniformly over the entire area of said tray; and means for dispensing a metered amount of liquid material to be dehumidified to each of said trays.

16. An industrial system as set forth in claim 15 wherein said liquid grease dispenser includes an enclosure, an actuating switch at one end of said closure, a tray entry at the other end of said enclosure, a liquid grease spray positioned at the upper end of said enclosure and connected to said actuating switch, a tray exit means at the lower end of the enclosure, and also connected to said switch, means to enter said tray to actuate said switch thereby causing said spray to be actuated and said exit means to be actuated whereby said spray is operative to apply a given amount of grease uniformly over said tray.

References Cited by the Examiner

UNITED STATES PATENTS

| | | | |
|---|---|---|---|
| 1,722,699 | 7/1929 | Greenwald | 62—507 |
| 2,216,475 | 10/1940 | Metcalf | 62—173 |
| 2,223,972 | 12/1940 | Sterling | 62—63 |
| 2,244,551 | 6/1941 | Crawford | 165—21 |
| 2,402,921 | 6/1946 | Sharpe | 62—380 |
| 2,527,542 | 10/1950 | Gilson | 62—63 |
| 3,175,596 | 3/1965 | Raue | 34—62 |

WILLIAM J. WYE, *Primary Examiner.*